March 17, 1970  G. M. JUREDINE  3,501,370
TOP-COATED AND COLOR-STABILIZED FOAMED PVC ARTICLE
AND PLASTISOL LIQUID COMPONENT THEREOF
Filed Feb. 20, 1967
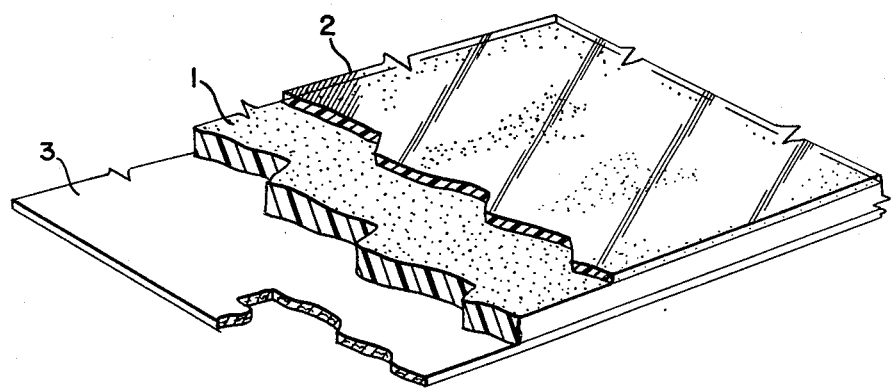
INVENTOR.
GORDON M. JUREDINE
BY
T. A. Te Grotenhuis
ATTORNEY 3,501,370
Patented Mar. 17, 1970

3,501,370
TOP-COATED AND COLOR-STABILIZED FOAMED PVC ARTICLE AND PLASTISOL LIQUID COMPONENT THEREOF
Gordon M. Juredine, Cleveland Heights, Ohio, assignor to Synthetic Products Company, Cleveland, Ohio, a corporation of Ohio
Filed Feb. 20, 1967, Ser. No. 617,365
Int. Cl. B32b 5/18
U.S. Cl. 161—160
19 Claims

ABSTRACT OF THE DISCLOSURE

Laminated articles having foamed designs and outstanding color permanence and clarity are produced by incorporating into the plastisol, from which the top-coating is formed, 100 parts of PVC, zinc and barium soaps having 6 to 12, inclusive, carbon atoms to provide 0.003 to 0.08 part each of zinc and barium, a mixture of about equal parts of an alkyl diaryl phosphite with a linear polyaryl polyalkylene ether-polyphosphite to provide .04 to 0.8 part of phosphorus and preferably .001 to 0.5 part of a higher fatty acid.

---

The present invention relates to a top-coated, foamed polyvinyl chloride article, to an improved top-coating for foamed polyvinyl chloride articles, and to a method for making such articles. Polyvinyl chloride is sometimes hereinafter designated by the often used term, PVC.

Floor coverings comprising foamed polyvinyl chloride compositions of various color combinations and designs are now being marketed. These foamed coverings have many advantages over the unfoamed floor coverings, but they must be provided with a wear-resistant top-coating which in most cases must be transparent and colorless to permit the design and color of the base to be visible and, in fact, to accentuate the design and appearance of the floor covering. The foamed polyvinyl chloride is usually blown with an azo-type blowing agent, such for example as azodicarbonamide. Such foam may contain or develop chromophoric groups which lead to color change or darkening of the floor coverings, particularly in such places as near radiators where low temperature (160° F. to 210° F.) aging takes place. Replacement of such blown floor coverings has been very costly to the manufacturer.

It is an object of the present invention to provide a composition and a method of making a composition that may be applied to a surface of shaped polyvinyl chloride compounds, such as films or layers thereof, before or after the heat-decomposition of the blowing agent, to form a wear-resistant top-coating over the sponge produced, which top-coating inhibits or prevents color change in the surface regions of the chemically blown polyvinyl chloride articles and which improves the appearance thereof.

It is a further object of the present invention to provide a blown PVC base article and a method of making such articles which shows colors and designs with high clarity and which eliminates or inhibits color change on low temperature aging and also during the high temperature processing necessary during manufacture of the article.

It is another object of this invention to provide a stabilizer that may be easily mixed with one or more plasticizers for PVC to provide part or all of the liquid phase of a plastisol compound, which, when applied to foamable or foamed PVC, will inhibit color changes on aging.

Other objects will be apparent from the following description of my invention, as illustrated in part by the appended drawing, which is a perspective view, with parts broken away, of a foamed article embodying the present invention.

Referring to the drawing, the foamed article comprises essentially a base 1 of chemically blown polyvinyl chloride compound and wear-resistant top coating 2, which is preferably transparent and of high clarity. The base 1 may optionally be attached to a backing, such as a paper or fabric material or other fibrous material 3. The base 1 may have designs (not shown) of varied colors and density therein. It may be formed by calendering a plastic PVC (polyvinyl chloride) compound containing a blowing agent dispersed therethrough into sheet or strip form, with or without backing, or it may be formed by applying a plastisol compound containing blowing agent onto a suitable backing, or onto a paper which is coated to prevent adhesion, and then heating to gel and fuse the plastisol prior to applying the top-coating thereon. To insure a very fine pore structure in the base 1, the blowing agent is preferably dispersed in the PVC base compound by utilizing a preformed paste comprising very finely ground particles of blowing agent dispersed in a liquid plasticizer, such as dioctyl phthalate, epoxidized soybean oil, etc. for the polyvinyl chloride. The blowing of the PVC compound is, of course, dependent on the temperature obtained and the decomposition temperature of the blowing agent which has been dispersed in the PVC compound.

The top-coating 2 is applied as a liquid plastisol to the calendered surface (blown or unblown) of the base 1, or to the surface of the gelled or gelled and fused base 1 if the latter is formed by the plastisol technique. After the application of the top-coating to the solid resin base layer 1, the whole is pressed through a suitable oven or heating zone to cause gelling and fusing of the top coating layer. If the base layer 1 has not been previously heated sufficiently to decompose the blowing agent therein, the heating at this time should be sufficiently high to also cause such decomposition and formation of sponge.

The plastisol for formation of the top-coating of the present invention comprises a suitable plastisol-type polyvinyl chloride resin, one or more plasticizers therefor, usually some volatile but relatively high boiling solvent, and stabilizing ingredients.

The PVC resins are generally characterized by having fine particle size, but of relatively smooth surface or low surface area as indicated by low liquid absorption, as compared to PVC resins which are deliberately blown to provide a porous surface, so as to absorb plasticizer and permit making of dry-mix compounds. Examples of suitable plasetisol type resins are those commercially available under the trade names Opolan VR–50, Geon 120X–203, Exon 654, etc. In addition to such PVC resins, copolymers of vinyl chloride and one or more of vinyl acetate and vinylidene chloride having 50% or more of combined vinyl chloride (preferably 80% or more) may be used as part or all of the plastisol resin.

The plasticizing constituent may be any one or more of the available liquid plasticizers for PVC. Those commonly used include those of the epoxy type, for example Paraplex G62 (an epoxidized soybean oil) and Admix 746, the ester type such as dioctyl adipate and dioctylphthalate and diisooctyl-phthalate, the benzoate type such as glycol benzoates, for example the Benzoflexes, including Benzoflex 2–45 (diethylene glycol benzoate) and Benzoflex P–200 (polyethylene glycol dibenzoate), Texanol-Isobutyrate (isobutyrate), etc. The amount of plasticizer used depends both on the efficiency thereof and the hardness desired for the top-coating. It is usually preferable that the plasticizer comprise about one-half or about 35% to 65% of the weight of the resin, although from about 20% to 100% of the weight of the resin is sometimes used.

Both the plasticizer and the volatile solvent function to facilitate spreading or application of the top-coating on the foamed or foamable PVC base layer 1. Thinner coatings are obtained with less viscous plastisols. The amount of volatile solvent used is therefore largely determined by the fluidity or viscosity desired. When greater hardness in the top-coating is desired, a less efficient plasticizer may be used and/or the amount of plasticizer may be reduced and more volatile, but relatively high boiling solvent may be added to produce the desired fluidity.

The component of the plastisol to which the present invention is particularly directed is the stabilizer. The composition of this component is critical when the plastisol is used to provide a top-coating over a blown (sponge) PVC compound. The selection of the separate ingredients in the stabilizer and the balance or proportion of the amounts thereof is important, particularly when color brightnesss, color permanence and color reproducibility are major considerations.

The stabilizer comprises (1) a barium soap having 6 to 12, inclusive, preferably 8 to 10, inclusive, carbon atoms in the fatty acid radical thereof, (2) a zinc soap having 6 to 12, preferably 8 to 10, inclusive, carbon atoms in the fatty acid radicals thereof, (3) a mixture of (a) one or more alkyl diaryl phosphites and (b) one or more linear polyaryl (polyaryl here includes polyalkaryl) polyphosphites having phosphite groups connected through alkylene ether linkages having 1 to 4, and preferably 3 carbons in the alkylene groups thereof, i.e. having the groups

of the phosphite groups,

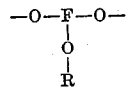

linked by one or more oxyalkylene ether linkages,

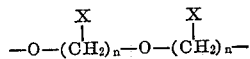

wherein $n$ is 1 to 3, preferably 2, X is hydrogen or methyl, and R is aryl or alkaryl and preferably phenyl, and having terminal oxygen valences connected to aryl (including alkaryl) groups, preferably (4) a high molecular weight (12 or more carbon atoms) fatty acid which is preferably unsaturated, such for example as oleic, ricinoleic and linoleic acids, and usually (5) a high boiling solvent mixture.

The stabilizer is used in amounts of 1 to 8 parts (usually 2 to 6 parts are preferred) per 100 parts of the PVC resin of the plastisol. In the stabilizer, a combination of the above barium and zinc soaps in the presence of the phosphites have about the same index of refraction as the fused resin. These soaps should be present in the amounts to provide 0.3% to 1.0%, preferably about 0.5% to 0.7%, of barium calculated as metal and 0.3% to 1% of zinc, preferably about .5% to .7% calculated as metal. With lesser amounts of these soaps the heat-stability becomes insufficient and with larger amounts the discoloration at low temperature aging becomes more rapid. The combination of barium and zinc soaps with the phosphite mixture maintains a blue-white reflectance. If a blue-white reflectance is not required, part or even all of the barium soap can be substituted by equivalent amounts of calcium soap. However, inasmuch as the barium is quite superior to calcium, at least one-half of the total of calcium and barium should generally be barium. The total of barium and calcium present should be 0.3% to 1% calculated as the elemental metals.

It is important in the products of my invention that the monophosphites have no more than two aryl groups present as triarylphosphites are found to hydrolyze or split off phenols which promote color change on low temperature aging of the article, even though such triarylphosphites are advantageous at higher temperatures encountered during processing.

The two classes of phosphites are used in about equal proportions or preferably about 40% to 50% of the alkyldiaryl phosphite should be used with about 60% to 50% of the linear polyphosphite. The mixture of phosphites acts as an antioxident in the plastisol and combines with the free radicals generated by light to which the article is exposed. It also cooperates with the soaps above used to provide the suitable index of refraction required. The mixture of the above particular types of phosphite provides the reaction rate required to counteract the free radicals caused by the light and radiation to which the foam is exposed.

The phosphites are used in the stabilizer in sufficient amount to provide 4% to 10% phosphorous (usually about 5% to 8%) calculated as elemental phosphorous. Maximum amounts of the phosphite are preferred commensurate with cost limitations.

The long-chain carboxylic acids (higher fatty acids), such as oleic, should be present in amounts of about 0.1% to 5% of the weight thereof. These higher fatty acids cooperate in a synergistic manner with wetting agents or surface active agents for nonaqueous vehicles to improve release of air from the plastisol and facilitate the formation of a more uniform film.

When the percentages of the effective ingredients are based on the weight of resin content of plastisol, the plastisol will contain the aforesaid ingredients in such amounts as to provide .003% to .08% of barium as metal, .003% to 0.08% of zinc as metal, 0.04% to 0.8% phosphorus as elemental phosphorus, and .001% to 0.5% of oleic acid or other equivalent fatty acid as aforementioned. The phosphorus is proportioned as aforementioned between the two types of phosphite compounds.

The alkyl group in the abovementioned alkyl diarylphosphites should have 6 to 12, inclusive, carbon atoms, preferably 8 to 10 carbon atoms in the alkyl group thereof. The aryl group is preferably phenyl or tolyl, although naphthyl-substituted phosphites may be used. Examples of the preferred alkyl diarylphosphites are decyldiphenylphosphite and octyldiphenylphosphite.

Examples of the above linear polyaryl polyphosphites, which must be mixed with the alkyl diarylphosphites to obtain the balance in the stabilizer required for the advantages aforesaid, are tetrakis(nonylphenyl)dipropylene glycol diphosphite, and decaphenyl heptakis(dipropylene glycol)octaphosphite. It will be seen that in these polyphosphites the terminal phosphate groups are attached to two phenyl (including alkyl-substituted phenyl) groups, and each phosphorus atom is connected directly to at least one aryloxy (including alkyl-substituted aryloxy) group.

The high boiling solvent mixture may or may not be used. It is however, desirable in properly homogenizing and solvating the ingredients of the stabilizer so that a clear film may be deposited from the plastisol. The solvent, if used, is primarily a high boiling point hydrocarbon (B.P. 200° to 400° F.) mixed with a small amount of one or more polyglycols or polyglycolethers, such as butyl carbitol (diethylene glycol butyl ether), dipropylene glycol methylether, tripropylene glycol, etc., preferably having 2 to 3 carbons in the alkylene groups thereof and up to 4 carbon atoms, inclusive, in any alkyl groups thereof. These glycols and glycol ethers when added improve compatibility and the soaps are conveniently first prepared as a solution in the solvent of about 25% solids content. Generally, the solvent mixture constitutes between 15 and 45% or 50% of the stabilizer component of the above plastisol with about 30% by weight being optimum.

The stabilizer functions not only as aforesaid to prevent discoloration and increase in brightness and clarity of contrasting colors, but also to improve release of entrapped air from the plastisol. To this end, the oleic acid, or equivalent similar fatty acid component, greatly assists other wetting agents which may also be present. We have found no available wetting agent which functions to release air from the plastisol layer as do the aforementioned fatty acids in combination with a wetting agent soluble in the liquid component of the plastisol.

The following examples, in which parts are by weight, illustrate the invention:

EXAMPLE 1

(A) A solution of barium octoate, containing about 2.9 to 3% barium, calculated as metal, is prepared by dissolving approximately 9 grams of barium octoate in 100 grams of a liquid mixture consisting principally of high boiling liquid hydrocarbons (B.P. 325° F.) with a minor amount of one or more of dipropylene glycol methylether and tripropylene glycol.

(B) Another solution containing about 3% of zinc, calculated as metal, is prepared by dissolving about 16.2 grams of zinc octoate in 100 grams of a mixture of high boiling liquid hydrocarbon solvent (B.P. 325° F.) and a minor amount of butyl carbitol (diethylene glycol monobutyl ether).

(C) A mixture is prepared of 45 parts by weight of one or more of octyl and decyl diphenyl phosphites with 55 parts of one or more of tetrakis(nonylphenyl)dipropylene glycol diphosphite and decaphenyl heptakis(dipropylene glycol)octaphosphite.

19.55 parts of the barium soap solution A above, 19.55 parts of the zinc soap solution B above, 58.1 parts of the mixed phosphites C above, and 1.80 parts of oleic acid are mixed together to form the stabilizer component for addition to the plastisol.

EXAMPLE 2

100 parts of Geon-120X-203 polyvinyl chloride resin are thoroughly mixed with 50 parts of a mixture of equal proportions of Paraplex G62 (epoxidized soybean oil) and dioctylphthalate and with 4 parts of the stabilizer of Example 1. The plastisol thus prepared contains per 100 parts of the resin, zinc and barium soaps sufficient to provide .023 part of each of barium and zinc calculated as metal, .0072 part of oleic acid, 1.28 part of the polyphosphites, and 1.08 part of the monophosphite. The plastisol is spread by suitable means, for example by means of a doctor-blade over the upper surface of a calendered base layer of blowable PVC compound containing azodicarbonamide dispersed therein as the blowing agent and having colored designs printed thereon. The whole is then passed into a continuous oven where the temperature is gradually raised to about 260° C. to cause gelling and fusing of the plastisol and decomposition of the blowing agent with resultant formation of the spongy polyvinyl chloride. The floor covering material thus produced is allowed to cool and has the design and colors strikingly apparent in true colors. Even after aging the flooring for long periods at low temperatures 160° F. to 210° F.) the color remains unchanged.

While in the top-coating compositions of the present invention other stabilizer ingredients are unnecessary, it is understood that other stabilizer compositions may be mixed with those of the present invention. Additional antioxidants may also be present if desired, but such should not include appreciable amounts, if any, of phenols, phenates, and triphenyl phosphites, which latter apparently hydrolyze to produce phenols that cooperate with groups derived from blowing agents to promote color changes on low temperature aging. While also unnecessary for ordinary use it is sometimes desirable to incorporate into the plastisol or into the stabilizer compositions a small amount of a potassium soap having 6 to 18, inclusive, carbon atoms, such as potassium hexoate, potassium laurate, potassium oleate, etc.

While I have described my invention with particular reference to floor coverings, the invention is not limited to such use. The laminated articles are also particularly useful for wall coverings, sports clothing, furniture and automotive upholstery, including arm rests, sidings, dashboards, crash pads, etc.

Having described my invention, I claim:

1. A laminated article suitable for use as a floor covering comprising a base layer of polyvinyl chloride compound, having at least portions thereof chemically blown to form a foam, and superimposed thereon and integral therewith a top-coating of gelled and fused polyvinyl chloride plastisol comprising 100 parts by weight of polyvinyl chloride, 20 to 100 parts liquid plasticizer therefor, a zinc fatty acid soap having 6 to 12, inclusive, carbon atoms in the fatty acid radical thereof in an amount to provide .003 to 0.08 parts of zinc calculated as metal, at least one member of the group consisting of barium and calcium soaps of a fatty acid of 6 to 12 carbon atoms in total amounts to provide .003 to .08 total parts of calcium and barium calculated as metal, and a mixture of about 40% to 50% of (a) at least one alkyl diaryl phosphite with (b) about 60% to 50% of a linear polyarylpolyphosphite having the groups

thereof linked by oxyalkylene ether linkages having 1 to 4 carbons in the alkylene groups, and wherein R is an aryl group (including alkaryl of 1 to 12 carbon atoms in alkyl groups) and where terminal oxygen valences are connected to aryl (including alkaryl having 1 to 12 carbon atoms in alkyl groups thereof) groups, said phosphites being present in amounts to provide 0.04 to 0.8 parts by weight of phosphorus.

2. A product according to claim 1 wherein the said barium soap is present in the composition in amounts to provide .003 parts to .08 parts by weight of barium calculated as the metal.

3. A product according to claim 2 wherein the said linear polyphosphite has 3 carbon atoms in at least some of the alkylene groups of said oxyalkylene ether linkages.

4. A product according to claim 3 wherein at least part of the soaps present is barium octoate and wherein there is also present .001 to 0.5 parts by weight of a fatty acid of 12 to 18, inclusive, carbon atoms.

5. A product according to claim 4 wherein the said phosphites comprise an alkyldiarylphosphite having 8 to 10, inclusive, carbon atoms in the alkyl group thereof and decaphenyl heptakis(dipropylene glycol)octaphosphite.

6. A product according to claim 1 wherein the said phosphites present comprise an alkyl diphenylphosphite having 8 to 10, inclusive, carbon atoms in the alkyl group and tetrakis(nonylphenyl)dipropylene glycol diphosphite.

7. A heat-resistant plastisol composition adapted to solidify at suitably elevated temperatures comprising as a major constituent dispersed particles of a polymer of a major proportion of vinyl chloride, a plasticizer therefor capable of combining with said particles of polyvinyl chloride at suitably elevated temperatures, said composition comprising for each 100 parts of polyvinyl chloride 20 to 100 parts of a liquid plasticizer therefor, zinc faty acid soap having 6 to 12 carbon atoms in the fatty acid radicals thereof in an amount to provide .003 to 0.08 part of zinc as metal, at least one member of the group consisting of barium and calcium soaps of fatty acids of 6 to 12 carbon atoms in total amounts to provide .003 to 0.08 part of the total of calcium and barium calculated as metals, a mixture of about 40% to 50% of (a) at least one alkyl diaryl phosphite with (b) about 60% to 50% of a linear polyarylpolyphosphite having the groups

thereof linked by oxyalkylene ether linkages having 1 to 4 carbon atoms in the alkylene groups, and wherein R is an aryl group (including alkaryl of 1 to 12 carbon atoms in alkyl groups) and where terminal oxygen valences are connected to aryl (including alkaryl having 1 to 12 carbon atoms in alkyl groups thereof) groups, said phosphites being present in amounts to provide 0.04 to 0.8 part by weight of phosphorus and .001 to 0.5 part by weight of a fatty acid of 12 to 18, inclusive, carbon atoms.

8. A product according to claim 7 wherein the said barium soap is present in the composition in amounts to provide .003 part to .08 part by weight of barium calculated as the metal.

9. A product according to claim 8 wherein the said linear polyphosphite has 3 carbon atoms in at least some of the alkylene groups of said oxyalkylene ether linkages.

10. A product according to claim 9 wherein at least part of the soaps present is barium octoate and wherein a high boiling hydrocarbon solvent is also present.

11. A product according to claim 9 wherein the said phosphites comprise an alkyldiarylphosphite having 8 to 10, inclusive, carbon atoms in the alkyl group thereof and decaphenyl heptakis(dipropylene glycol)octaphosphite.

12. A product according to claim 7 wherein said said phosphites present comprise an alkyl diphenylphosphite having 8 to 10, inclusive, carbon atoms in the alkyl group and tetrakis(nonylphenyl)dipropylene glycol diphosphite.

13. A stabilizing composition suitable for incorporation into plastisol compositions that inhibit color formaton over foamed compounds of vinyl chloride polymers, said stabilizing composition comprising a member of the group consisting of calcium and barium soaps having 6 to 12 carbon atoms in the fatty acid radicals thereof in a total amount to provide. 3 to 1 part by weight total of barium and calcium, calculated as barium and calcium metals, a zinc soap of 6 to 12 carbon atoms in an amount to provide .3 to 1 part by weight of zinc, calculated as zinc metal, a mixture of 40 to 50% of at least one alkyl diaryl phosphite with about 60 to about 50% of a linear polyaryl polyphosphite having the phosphite groups thereof linked together by alkylene ether linkages having 1 to 4 carbon atoms in the alkylene groups thereof and having all other phosphite oxygen atoms connected to aryl groups, said mixture being present in an amount to provide about 4 parts to about 10 parts by weight of phosphorus calculated as elemental phosphorus in said stabilizer, .1 part to about 5 parts by weight of the weight of said stabilizer of a long-chain carboxylic acid, and a high boiling solvent mixture comprising a high boiling liquid hydrocarbon and a minor amount of a member of the group consisting of polyglycols and glycol ethers having up to 4 carbon atoms in any alkyl group thereof and from 1 to 4 carbon atoms in the alkylene groups thereof, said solvent mixture comprising 15 to 50 parts by weight of said stabilizer.

14. The composition of claim 13 wherein the barium fatty acid soap is present in amount to provide .3 to 1 part of barium calculated as metal.

15. A composition according to claim 14 wherein at least some of the alkylene groups in the polyphosphite have 3 carbon atoms.

16. A composition according to claim 15 wherein said phosphite mixture comprises an alkyldiaryl phosphite having 8 to 10, inclusive, carbon atoms in the alkyl group thereof.

17. A product according to claim 16 wherein said mixture of phosphites comprise an alkyl diphenyl phosphite and tetrakis(nonylphenyl)dipropylene glycol diphosphite.

18. A product according to claim 17 wherein said phosphite mixture comprises decaphenyl heptakis(dipropylene glycol)octaphosphite.

19. A product according to claim 14 wherein barium soap is present in amounts to provide 0.5 to 0.7 part of barium as metal and wherein the said phosphites are present in amounts to provide 5 to 8 parts of phosphorus.

References Cited

UNITED STATES PATENTS 3,360,422 12/1967 Desch _____ 161—160
3,436,362 4/1969 Haryer et al. _____ 260—45.7

ROBERT F. BURNETT, Primary Examiner

W. J. VAN BALEN, Assistant Examiner

U.S. Cl. X.R.

161—161; 260—23, 45.7